No. 722,378. PATENTED MAR. 10, 1903.
H. I. McGUIRE.
CAR WHEEL.
APPLICATION FILED MAY 17, 1902.
NO MODEL.
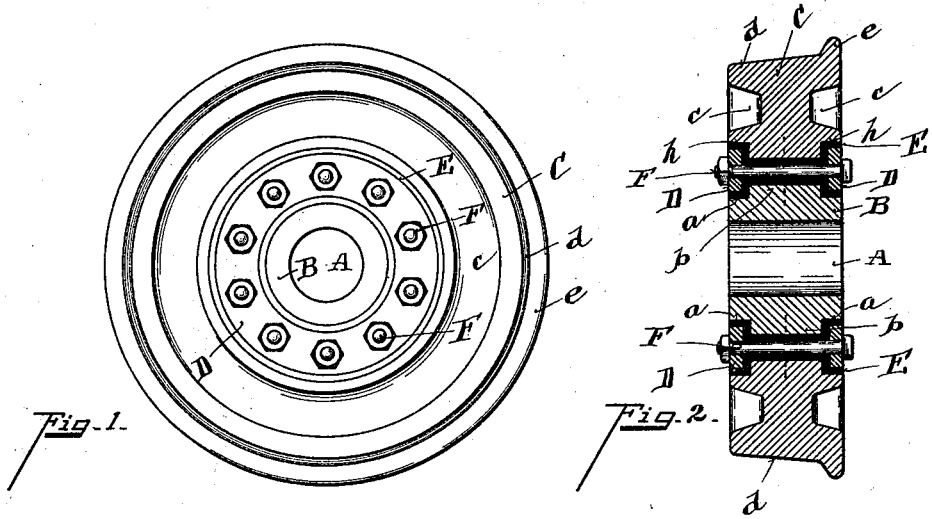
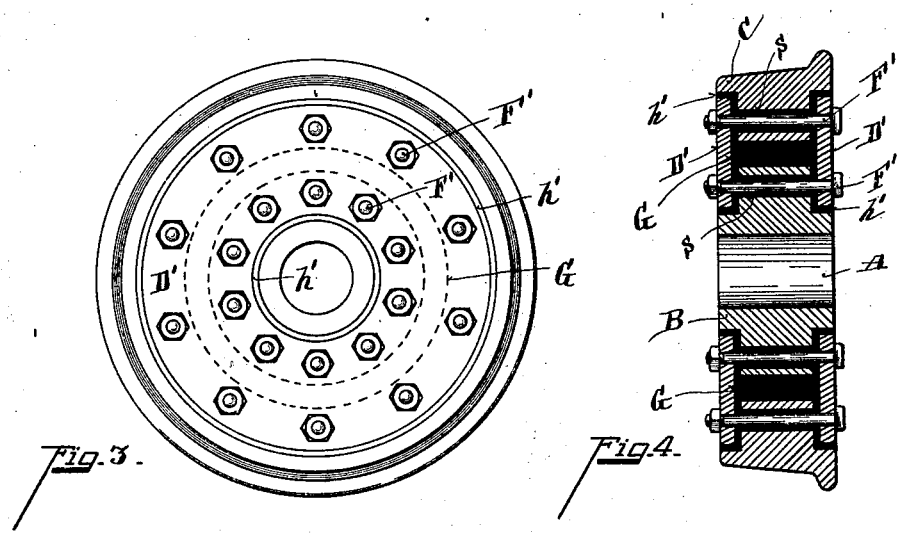
Witnesses
Oliver B. Kaiser
Edw J Lucas
Inventor
Henry I. McGuire
By Wood & Wood Attorneys
THE NORRIS PETERS CO., PHOTO-LITHO., WASHINGTON, D. C.

UNITED STATES PATENT OFFICE.

HENRY I. McGUIRE, OF CINCINNATI, OHIO, ASSIGNOR TO ELWOOD W. McGUIRE, OF RICHMOND, INDIANA.

CAR-WHEEL.

SPECIFICATION forming part of Letters Patent No. 722,378, dated March 10, 1903.

Application filed May 17, 1902. Serial No. 107,705. (No model.)

*To all whom it may concern:*

Be it known that I, HENRY I. MCGUIRE, a citizen of the United States, residing at Cincinnati, in the county of Hamilton and State of Ohio, have invented certain new and useful Improvements in Car-Wheels, of which the following is a specification.

The object of my invention is to provide an insulated car-wheel, so as to prevent currents of electricity from being conveyed through the axle to the rails or from the rails through the axle. It is believed that there is a great loss of electrical energy through the fact that all the wheels of the car take up more or less electricity and distribute it through the body of the car. It has also been found that energizing the body of the wheel injures or causes crystallization of the structure, sometimes rendering the metal soft in places, so that they wear uneven and soon become useless, beside the material weakening of the structure due to the electrical energy permeating through the body of the wheel. My invention overcomes this by making a thorough insulation between the axle and the tread of the wheel.

The features of my invention are more fully set forth in the description of the accompanying drawings, forming a part of this specification, in which—

Figure 1 is a side elevation of my improved car-wheel. Fig. 2 is a central vertical section of Fig. 1. Fig. 3 is a modification of Fig. 1. Fig. 4 is a central vertical section of Fig. 3.

A represents the axle-bore, constructed in the ordinary manner. B represents a metallic hub, the inner periphery of which forms the axle-bore. The outer periphery of this hub is made with annular gains or recesses *a*, having a central bearing portion *b*. The wheel is made of two sections formed separate and distinct from each other.

C represents the outer or rim section. In the preferred form of construction it is provided with annular recesses *c c*.

*d* represents the tread, and *e* the lip or flange, of the car-wheel. These two sections are insulated from each other and united by the following instrumentalities: At the inner periphery of the rim-section are two flanges or recesses *h*, the counterpart of the recesses *a* in the hub-section.

D represents two annular flat rings which serve as hoops or binding instrumentalities to anchor the rim-section onto the hub-section. In order to insulate the rim-section from the hub-section, there is interposed between the rings D a cup-shaped insulator E, insulating the peripheries of the hub and rim sections from each other. The insulation is extended inwardly entirely through the space between the hub and rim sections. Holes are formed through this insulator and annular rings for the reception of the bolts F. In order to facilitate the insertion of this insulator, it may be bisected annularly at any point between the hub, but preferably at the center, as shown by dotted lines, Fig. 2, and the peripheries of both rim and hub sections may be slightly tapered from the center outwardly. This insulator is preferably made of compressed pulp, papier-mâché, asbestos, or other suitable non-conducting lint adaptable for the purpose, the rim-section being secured to the hub-section by means of the binding ring or rings D and the bolts F, the rings D extending laterally and fitting into the recesses of the hub and rim sections, but are separated from contact thereby with the insulated cups. The bolts are shown as secured in position by nuts; but the bolts may be headed on both sides, if desired.

In the modification shown in Figs. 3 and 4 the same general construction is preserved; but the binding-rings D' are of larger vertical dimension and are secured by two rows of bolts F" F', each bolt having insulating-spools *s* encircling the same. The contour of the face of the rim-section is different; but this is immaterial and may be varied according to the size and character of the car-wheel. The spools *s* are preferably made of independent sections, the ends of which abut the cup-shaped insulator. It will be observed in the modification that the bolt-holes are through the hub and rim sections, respectively, and are insulated from each other by the insulating-ring G, and the insulation is made perfect between the two sections by means of the cup-shaped insulator *h'* and the spools s. Another advantage obtained by this construction is the insulating material acts as a cushion, materially lessening the noise and jar of the car-wheels running on metal rails.

Having described my invention, I claim—

1. A car-wheel made of a hub-section and a rim-section, insulating material inserted between the adjacent edges of said sections, annular clamping-rings applied to the face of said sections and separated from metallic contact therewith by insulating material, and tie-bolts passing through said rings and said section and anchoring the same together, substantially as specified.

2. A car-wheel made of a hub-section and a rim-section, insulating material inserted between the adjacent edges of said sections, annular clamping-rings applied to the faces of said sections, the whole secured together by tie-bolts passing through said rings and insulating material, substantially as specified.

3. A car-wheel made from hub and rim sections, insulating material inserted between the adjacent edges of said sections, clamping means applied to each of said sections through the medium of insulating material, preventing metallic contact of the clamping devices with said hub and rim sections, substantially as specified.

In testimony whereof I have hereunto set may hand.

HENRY I. McGUIRE.

Witnesses:
OLIVER B. KAISER,
IDA J. LUCAS.